Patented Oct. 28, 1947

2,429,858

UNITED STATES PATENT OFFICE 2,429,858

ADDITIVE TERPENE ETHERS OF MERCAPTO-ACIDS AS MILLING AIDS FOR BUTADIENE-STYRENE COPOLYMERS

John R. Vincent, Wilmington, and Gastao Etzel, Newark, Del., assignors to E. I. du Pont de Nemours & Company, Wilmington, Del., a corporation of Delaware No Drawing. Application April 11, 1944, Serial No. 530,550

6 Claims. (Cl. 260—36)

This invention relates to a method of improving the processability of butadiene-styrene elastomers, and has for its object the addition of materials to the butadiene-styrene elastomers whereby they can be more readily and quickly processed with the machinery ordinarily employed in the processing of natural rubber.

In attempting to replace natural rubber with the synthetic rubbers such as the butadiene-styrene elastomers which have been designated by the U. S. Government as "GR-S", one of the major problems has been the working of such synthetic elastomers on the usual rubber working machinery. The working of such synthetic rubbers, even where it is possible to carry it out on the usual rubber machinery, requires excessive time to effect the break-down or to properly compound the same with the necessary compounding materials. Where long periods of working are required to effect the desired result, the volume output per unit of equipment is necessarily low, and the power consumption unduly high.

We have found that the processability of the butadiene-styrene elastomers can be greatly improved if there is incorporated therein from 0.05% to 10% of a terpene thioether of an alpha-mercapto carboxylic acid or a metal salt of such acid. The addition of a small amount of the compound of this class to the butadiene-styrene elastomer has been found to result in a material decrease in the time of milling required to break down the elastomer to a condition satisfactory for the introduction of compounding ingredients. It also results in a substantial decrease in the time required for introducing the compounding ingredients into such elastomer.

Terpenyl ethers of the alpha-mercapto carboxylic acids have the structure represented by:

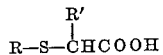

where R is the radical of the terpene from which the thioether is formed, such as that derived from pinene, and R' is hydrogen or an aliphatic or aromatic hydrocarbon radical. The preparation of these compounds may be carried out as follows, in which camphene is the terpene used to illustrate the process: Fifteen (15) parts of 84% thioglycollic acid, 55.5 parts of camphene, and one part of p-toluene sulfonic acid are agitated at 95° C. for 24 hours. The excess of unreacted oils is then removed by steam distillation and the residue is saponified on a steam bath with 7 parts of potassium hydroxide in 50 parts of ethyl alcohol. The reaction mass is diluted with water, extracted with benzene, acidified, and again extracted with benzene. The second benzene extract yields on evaporation 21.7 parts of the isobornyl ether of thioglycollic acid.

The effectiveness of such compounds in reducing the milling time of a butadiene-styrene polymer is illustrated by the following data. This data was obtained using a laboratory rubber mill having rolls 6 inches long and two inches in diameter, running at the same speed. The rolls were set at 0.030 inch apart and were kept at 70°±1° C. during the testing. A sample (50 g.) of the elastomer was milled until a band free of holes, for at least the time required for one revolution of the mill rolls, was obtained. The time required to produce such a band was noted. The experiment was then repeated with an identical sample of elastomer and the ether was added to the elastomer at the beginning of the test, and as quickly as possible. The time to produce a band free of holes was again noted. By comparing the results of such a pair of tests the improvement in milling time provided by the added processing agent can be expressed in terms of the percentage reduction in milling time.

The following table shows the effect of the isobornyl ether of thioglycollic acid on four different lots of GR-S (the butadiene-styrene elastomer made under the Government's synthetic rubber program), produced by three different manufacturers.

| Manufacturer | Lot No. | Amount of the ether added | Reduction in milling time |
|---|---|---|---|
|  |  | Per cent | Per cent |
| A | 1 | 4 | 58 |
| A | 2 | 4 | 77 |
| B | 2 | 4 | 49 |
| C | 1 | 4 | 22 |

The effect of the pinene ether of thioglycollic acid is shown in the next table.

| Manufacturer | Lot No. | Amount of the ether added | Reduction in milling time |
|---|---|---|---|
|  |  | Per cent | Per cent |
| A | 1 | 4 | 78 |
| A | 2 | 4 | 62 |
| B | 2 | 4 | 46 |

Similarly good effects are produced by metal salts of these acids. For example, the results obtained with some salts of the pinene ether of thioglycollic acid in GR-S of Manufacturer B, lot 2, are shown in the following table.

| Salt | Amount of salt added | Reduction in milling time |
|---|---|---|
| | Per cent | Per cent |
| Zinc pinene thioglycollate | 4 | 64 |
| Cobalt pinene thioglycollate | 2 | 46 |
| Manganese pinene thioglycollate | 1.4 | 52 |

These data make it apparent that the salts are equally or even more effective than the free acids.

These results show the very large saving in time and in power that may be obtained by using small amounts of such compounds in a butadiene-styrene elastomer. Further savings in time and power are obtained during the compounding operations, particularly during the incorporation of a carbon black into the elastomer.

The butadiene-styrene elastomer may contain from about 5% to 60% styrene.

The terpene thioethers of other alpha-mercapto acids which contain from 2 to 8 carbon atoms, such as alpha-mercapto propionic acid, alpha-mercapto butyric acid and alpha-mercapto phenyl acetic acid, may be used in place of thioglycollic acid.

Other unsaturated terpenes may be used in preparing the terpene thioethers. These include such terpenes as the alpha- and beta-terpinene, terpinolene, alpha- and beta-phellandrene, limonene, pseudolimonene, p-menthadiene, fenchene, carene, bornylene, etc.

The terpene thioether of the alpha-mercapto carboxylic acid or the metal salt thereof, is preferably employed in an amount equal to 0.05% to 5% of the weight of the elastomer. These compounds are effective at any temperature between 25° and 150° C., and they may be introduced into the elastomer and used in an internal mixer, as well as on the mill.

We claim:

1. A method for improving the processing characteristics of butadiene-styrene interpolymers containing from 5% to 60% of styrene, which comprises incorporating in said interpolymer from 0.5% to 5.0%, based on the weight of the interpolymer, of a compound of the class consisting of additive terpene thioethers of alpha-mercapto mono-carboxylic acids and the zinc, cobalt and manganese salts thereof, in which the mercapto acid is a saturated aliphatic acid and contains from 2 to 4 carbon atoms.

2. A method for improving the processing characteristics of butadiene-styrene interpolymers containing from 5% to 60% of styrene, which comprises incorporating in said interpolymer from 0.5% to 5.0%, based on the weight of the interpolymer, of the additive pinene ether of thioglycollic acid.

3. A method for improving the processing characteristics of butadiene-styrene interpolymers containing from 5% to 60% of styrene, which comprises incorporating in said interpolymer from 0.5% to 5.0%, based on the weight of the interpolymer, of the zinc salt of the additive pinene ether of thioglycollic acid.

4. A millable and readily processable butadiene-styrene interpolymer containing from 5% to 60% of styrene having incorporated therein from 0.5% to 5.0%, based on the weight of the interpolymer, of a compound of the class consisting of additive terpene thioethers of alpha-mercapto mono-carboxylic acids and the zinc, cobalt and manganese salts thereof, in which the mercapto acid is a saturated aliphatic acid and contains from 2 to 4 carbon atoms.

5. A millable and readily processable butadiene-styrene interpolymer containing from 5% to 60% of styrene having incorporated therein from 0.5% to 5.0%, based on the weight of the interpolymer, of the additive pinene ether of thioglycollic acid.

6. A millable and readily processable butadiene-styrene interpolymer containing from 5% to 60% of styrene having incorporated therein from 0.5% to 5.0%, based on the weight of the interpolymer, of the zinc salt of the additive pinene ether of thioglycollic acid.

JOHN R. VINCENT.
GASTAO ETZEL.